(12) United States Patent
Peng et al.

(10) Patent No.: US 12,673,352 B2
(45) Date of Patent: Jul. 7, 2026

(54) SYSTEM AND METHOD FOR LOW-TEMPERATURE TREATMENT OF HEAVY METALS AND DIOXINS IN FLY ASH

(71) Applicant: Zhejiang University, Hangzhou (CN)

(72) Inventors: Yaqi Peng, Hangzhou (CN); Shengyong Lu, Hangzhou (CN); Chengbo Zhang, Hangzhou (CN); Shuai Wang, Hangzhou (CN); Lizheng Jin, Hangzhou (CN); Jiamin Ding, Hangzhou (CN); Xiaodong Li, Hangzhou (CN); Jianhua Yan, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 550 days.

(21) Appl. No.: 18/195,174

(22) Filed: May 9, 2023

(65) Prior Publication Data

US 2023/0398587 A1     Dec. 14, 2023

(30) Foreign Application Priority Data

Jun. 13, 2022   (CN) .......................... 202210667099.5

(51) Int. Cl.
*B09B 3/80*          (2022.01)
*B09B 101/30*          (2022.01)
(Continued)

(52) U.S. Cl.
CPC ................ *B09B 3/80* (2022.01); *C02F 1/001* (2013.01); *C02F 1/04* (2013.01); *C02F 1/283* (2013.01);
(Continued)

(58) Field of Classification Search
None
See application file for complete search history.

(56) References Cited

U.S. PATENT DOCUMENTS

| | | | | |
|---|---|---|---|---|
| 2010/0000444 A1* | 1/2010 | Constantz | ............... | C02F 1/683 |
| | | | | 210/205 |
| 2023/0149989 A1* | 5/2023 | Kubota | .................... | B09B 3/40 |
| | | | | 204/158.21 |
| 2024/0261835 A1* | 8/2024 | Lin | ........................... | B09B 3/70 |

FOREIGN PATENT DOCUMENTS

| | | |
|---|---|---|
| CN | 2729545 Y | 9/2005 |
| CN | 102513329 A | 6/2012 |

(Continued)

OTHER PUBLICATIONS

Technical Specification for Pollution Control of Fly-ash from Municipal Solid Waste Incineration, HJ 1134-2020, the Ministry of Health and Environment, 2020, 20 pages.

*Primary Examiner* — John J Figueroa
(74) *Attorney, Agent, or Firm* — PORUS IP LLC

(57)          ABSTRACT

Provided is a system and a method for low-temperature treatment of heavy metals and dioxins in fly ash. In the present disclosure, the fly ash is subjected to tertiary water washing and then separation by pressure filtration with a plate and frame filter press to obtain fly ash after the tertiary water washing. A low-temperature heat treatment is conducted on the fly ash after the tertiary water washing in a stirring reactor by adding an additive combination. Chlorine salts in the fly ash can be effectively removed by the tertiary water washing, which avoids the chlorination of a precursor in the fly ash to form dioxins during the low-temperature pyrolysis, thereby improving a heat reduction efficiency of the dioxins in the fly ash. Moreover, the reduction of a chlorine content in the fly ash can also avoid deactivation of the additives and improve a solidification effect of the heavy metals.

9 Claims, 1 Drawing Sheet

(51) Int. Cl.
    *C02F 1/00*       (2023.01)
    *C02F 1/04*       (2023.01)
    *C02F 1/28*       (2023.01)
    *C02F 1/52*       (2023.01)
    *C02F 1/56*       (2023.01)
    *C02F 1/62*       (2023.01)
    *C02F 1/66*       (2023.01)

(52) U.S. Cl.
    CPC .............. *C02F 1/5236* (2013.01); *C02F 1/56*
        (2013.01); *C02F 1/62* (2013.01); *C02F 1/66*
          (2013.01); *B09B 2101/30* (2022.01); *C02F*
        *2001/007* (2013.01); *C02F 2301/08* (2013.01)

(56)               References Cited

FOREIGN PATENT DOCUMENTS

| CN | 104056534 A | 9/2014 |
| CN | 105126606 A | 12/2015 |
| CN | 113814259 A | 12/2021 |
| CN | 114210716 A | 3/2022 |
| CN | 114602952 A | 6/2022 |
| KR | 20210129867 A | 10/2021 |
| WO | 2015187780 A1 | 12/2015 |

* cited by examiner

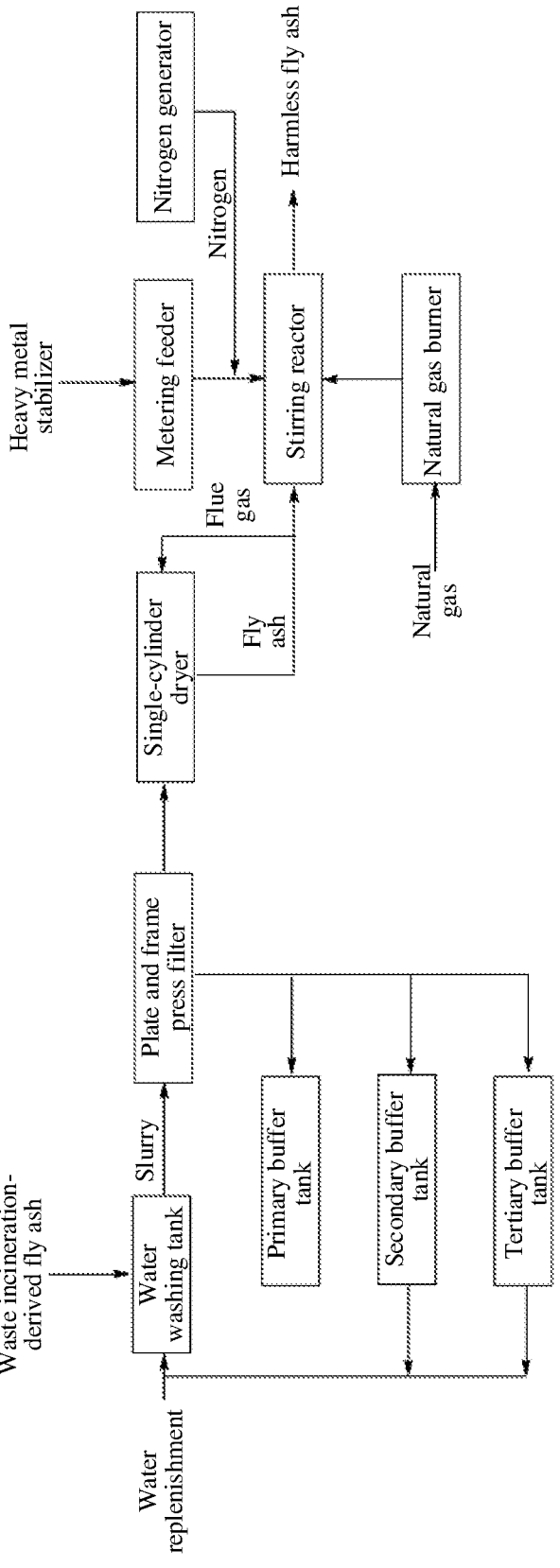

SYSTEM AND METHOD FOR LOW-TEMPERATURE TREATMENT OF HEAVY METALS AND DIOXINS IN FLY ASH

CROSS REFERENCE TO RELATED APPLICATION

This patent application claims the benefit and priority of Chinese Patent Application No. 202210667099.5, filed with the China National Intellectual Property Administration on Jun. 13, 2022, the disclosure of which is incorporated by reference herein in its entirety as part of the present application.

TECHNICAL FIELD

The present disclosure belongs to the technical field of environmental protection, and in particular relates to a system and a method for low-temperature treatment of heavy metals and dioxins in fly ash.

BACKGROUND

Fly ash from waste incineration contains easily leached heavy metals and traces of persistent organic pollutants, dioxins. China includes the fly ash in the National List of Hazardous Wastes. In order to prevent and control environmental pollution, improve the quality of the ecological environment, and standardize and guide the environmental management of domestic waste incineration-derived fly ash, the Ministry of Ecology and Environment has issued the "*Technical specification for pollution control of fly-ash from municipal solid waste incineration*" (HJ1134-2020). This document sets out more detailed norms and standards for the disposal of fly ash derived from waste incineration. Fly ash treatment processes such as low-temperature thermal decomposition, high-temperature sintering, and high-temperature melting should meet the following requirements: I, a total amount of dioxin residues in the fly ash treatment products should be controlled at not greater than 50 ng-TEQ/kg (based on a fly ash dry weight); II, a leaching concentration of heavy metals does not exceed the maximum allowable discharge concentration specified in GB 8978; and III, a content of soluble chlorine should not exceed 2%, preferably not greater than 1%.

The harmless disposal technology of fly ash can be divided into heat treatment and non-heat treatment. The heat treatment mainly includes sintering, fusion vitrification, low-temperature heat treatment, hydrothermal treatment, and supercritical water oxidation. The non-heat treatment includes cement curing, agent stabilization, biological/chemical leaching, and mechanochemical treatment. The non-thermal treatment of fly ash solidifies heavy metals by adding chemicals. However, the chemicals have no degrading effect on the dioxins. Low-temperature heat treatment of fly ash is considered to be one of the best approaches to degrade dioxins in the fly ash. In an inert atmosphere, a degradation rate of the dioxin can reach 90% when the fly ash is treated at 300° C. for 2 h. However, the low-temperature heat treatment lacks control of heavy metals. Moreover, fly ash after the low-temperature heat treatment needs to be added with chemicals, and then subjected to mechanochemical treatment, cement curing and the like to meet the hazardous waste landfill standard.

The related patent CN105126606A disclosed a low-temperature pyrolysis-catalytic degradation method for treating volatile organic compounds in incineration fly ash. In this method, the fly ash is transported to a low-temperature pyrolysis device, and pyrolyzed at 100° C. to 350° C. for 10 min to 60 min in a non-oxidizing atmosphere to generate a pyrolysis mixture. The pyrolysis mixture is sent to a catalytic degradation device, and then degraded for 300 sec at 100° C. to 400° C. in an oxidizing atmosphere under the presence of a catalyst of titanium, tungsten, or vanadium. This method lacks the solidification of heavy metals, and the treated fly ash is still filled up for disposal, such that the method cannot achieve the resource utilization of fly ash, and has a poor economic efficiency. Patent CN2729545Y disclosed a device for harmless stabilization of fly ash containing dioxins and heavy metals. In this method, amines are mixed with the fly ash to conduct oxidization, followed by complexation with a pozzolanic active material to solidify the heavy metals. However, the method requires a large amount of chemicals, and has a high cost. In addition, dioxins are easy to regenerate under oxidative conditions, such that the method cannot guarantee a degradation effect of the dioxins.

SUMMARY

In order to solve the problems in the prior art, an objective of the present disclosure is to provide a system and a method for a low-temperature harmless treatment of heavy metals and dioxins in fly ash.

To achieve the above objective, the present disclosure adopts the following technical solutions:

A first aspect of the present disclosure is to provide an additive combination for solidification treatment of heavy metals and dioxins in fly ash, including a high-temperature section-targeted pyrolysis additive and a low-temperature section-targeted pyrolysis additive; where the high-temperature section-targeted pyrolysis additive is a calcium-based additive for a reaction at 300° C. to 350° C.; and the low-temperature section-targeted pyrolysis additive is obtained by mixing a phosphate and a ferric salt at a mass ratio of (3-5):1, and is used for a reaction at less than or equal to 250° C.;

preferably, the calcium-based additive is obtained by mixing CaO and CaSO$_4$ at a mass ratio of 1:(1-3); and preferably, the phosphate is selected from the group consisting of Ca$_3$(PO$_4$)$_2$, Ca(H$_2$PO$_4$)$_2$, and NaH$_2$PO$_4$; and the ferric salt is selected from the group consisting of Fe$_2$(SO$_4$)$_3$ and Fe(NO$_3$)$_3$.

A second aspect of the present disclosure is to provide a system for low-temperature treatment of heavy metals and dioxins in fly ash, including:

a water washing tank configured to receive fly ash and water, and wash the fly ash;

a plate and frame filter press connected to the water washing tank, and configured to conduct solid-liquid separation on an obtained water-washed fly ash, and then transport an obtained fly ash slurry to the water washing tank using a diaphragm pump to repeat three times of water washing;

a buffer tank connected to the plate and frame filter press and the water washing tank, and configured to store an obtained fly ash water washing solution after pressure filtration, and pump the fly ash water washing solution to the water washing tank for secondary use;

a single-cylinder dryer connected to the plate and frame filter press, and configured to dry an obtained tertiary fly ash slurry after tertiary water washing and pressure filtration;

a stirring reactor connected to the single-cylinder dryer, and configured to conduct a heat treatment at 300° C. to 350° C. and a low-temperature heat treatment at 200° C. to 250° C. on the fly ash; where flue gas in the stirring reactor provides a heat source for the single-cylinder dryer;

a metering feeder connected to the stirring reactor, and configured to separately deliver the calcium-based additive for the reaction at 300° C. to 350° C. and the low-temperature section-targeted pyrolysis additive for the reaction at 200° C. to 250° C. according to claim 1 to the stirring reactor; and a nitrogen generator connected to the stirring reactor, and configured to supply nitrogen to the stirring reactor;

preferably, the system for low-temperature treatment further includes a natural gas burner connected to the stirring reactor, where the natural gas burner is configured to provide a heat source for a heating layer of the stirring reactor by burning natural gas;

preferably, the buffer tank includes a primary buffer tank, a secondary buffer tank, and a tertiary buffer tank; the primary buffer tank is connected to the plate and frame filter press, and is configured to store a resulting primary fly ash water washing solution after first pressure filtration; the secondary buffer tank is connected to the plate and frame filter press and the water washing tank, and is configured to store a resulting secondary fly ash water washing solution after second pressure filtration, and pump the secondary fly ash water washing solution into the water washing tank for recycling; and the tertiary buffer tank is connected to the plate and frame filter press and the water washing tank, and is configured to store a resulting tertiary fly ash water washing solution after third pressure filtration, and pump the tertiary fly ash water washing solution into the water washing tank for recycling;

preferably, in the water washing tank, the fly ash and the water are mixed at a liquid-to-solid ratio of 3 mL: 1 g.

A third aspect of the present disclosure is to provide a method for low-temperature treatment of heavy metals and dioxins in fly ash using the system for low-temperature treatment according to the second aspect of the present disclosure, including the following steps:

S1, receiving fly ash and water with the water washing tank, and conducting water washing;

S2, conducting pressure filtration on a water-washed fly ash obtained in step S1 with the plate and frame filter press to obtain a fly ash slurry and a primary water washing solution; transporting the fly ash slurry to the water washing tank with the diaphragm pump to conduct secondary water washing, and repeating the water washing twice to obtain fly ash after tertiary water washing;

S3, drying the fly ash after tertiary water washing with the single-cylinder dryer;

S4, crushing dried fly ash obtained in step S3 with the stirring reactor;

S5, evacuating air in the stirring reactor with nitrogen generated by the nitrogen generator; and when an oxygen content in the stirring reactor is less than 1%, providing a heat source for the stirring reactor with a natural gas burner;

S6, when the stirring reactor reaches 300° C. to 350° C., adding the calcium-based additive according to the first aspect of the present disclosure to the stirring reactor with the metering feeder; and S7, when the stirring reactor is cooled to 200° C. to 250° C., adding the low-temperature section-targeted pyrolysis additive according to the first aspect of the present disclosure to the stirring reactor after step S6 with the metering feeder, and conducting low-temperature pyrolysis;

preferably, in step S1, the fly ash and the water are mixed at a liquid-to-solid ratio of 3 mL: 1 g;

preferably, in step S3, the single-cylinder dryer has an operating temperature of 160° C. to 180° C.;

preferably, in step S6, the calcium-based additive is added at 5% to 10% of a mass of the fly ash; and the calcium-based additive is obtained by mixing CaO and $CaSO_4$ at a mass ratio of 1:(1-3);

preferably, in step S7, the low-temperature section-targeted pyrolysis additive is obtained by mixing a phosphate and a ferric salt at a mass ratio of (3-5):1; and the low-temperature section-targeted pyrolysis additive is added at 5% to 10% of a mass of the fly ash.

The present disclosure has the following beneficial effects:

Compared with the prior art, the present disclosure has the following beneficial effects.

(1) In the present disclosure, the fly ash is subjected to tertiary water washing using the water washing tank, the plate and frame filter press, and the buffer tank, which can save water and equipment investment. Chlorine salts in the fly ash can be effectively removed by the tertiary water washing, which avoids the chlorination of a precursor in the fly ash to form dioxins during the low-temperature pyrolysis, thereby improving a heat reduction efficiency of the dioxins in the fly ash. Moreover, the reduction of chlorine content in the fly ash can also avoid deactivation of the additives and improve a solidification effect of the heavy metals.

(2) In the present disclosure, a fly ash slurry is dried at 160° C. to 180° C., thus avoiding a large amount of agglomeration and hardening of the fly ash slurry at high temperatures, and avoiding the generation of dioxins by the fly ash under high-temperature and oxygen-containing conditions. Moreover, the single-cylinder dryer uses flue gas pyrolyzed in the reactor as a heat source, to realize waste heat recovery and reduce reaction energy consumption.

(3) In the present disclosure, a calcium-based additive as well as phosphate and ferric salt additives stabilize and solidify heavy metals while thermally degrading dioxins, thereby effectively reducing a leaching concentration of the heavy metals. The calcium-based additive can improve a degradation efficiency of dioxins in the fly ash at 300° C. to 350° C., and form complexes with the heavy metals such as Cd and Cr. Combined with characteristics of the phosphate and ferric salt forming complexes with Pb, Zn, Cu and other heavy metals at relatively low temperatures, it is possible to stably solidify most of the heavy metals. The stirring reactor is added with the calcium-based additive during heating at high temperatures, and mainly conducts the degradation of dioxins and the solidification of Cd and Cr, and the heating is stopped after the above reactions are sufficient. After the temperature has dropped to 250° C., the phosphate and ferric salt additives are added to conduct the solidification on most of the other heavy metals. In this way, the decomposition of additives at high temperatures is avoided, and the energy consumption of the reactor is reduced.

BRIEF DESCRIPTION OF THE DRAWINGS

FIG. 1 shows a schematic diagram of the system for low-temperature treatment of heavy metals and dioxins in fly ash according to Example 1 of the present disclosure.

DETAILED DESCRIPTION OF THE EMBODIMENTS

All parts and percentages in this application are by weight unless otherwise indicated, implied from the context, or customary in the art. Also, the testing and characterization methods used are all current with the filing date of this application. Where applicable, the contents of any patents, patent applications, or publications referred to in this application are hereby incorporated by reference in their entirety. Moreover, equivalent patents of the same family as the present application are also incorporated by reference, especially the definitions of synthetic techniques, products and process designs, polymers, comonomers, initiators, or catalysts disclosed in these documents in the art. If the definition of a specific term disclosed in the prior art is inconsistent with any definition provided in the present application, the definition of the term provided in the present application shall prevail.

Numerical ranges in this application are approximations and therefore may include values outside the range unless otherwise indicated. Numerical ranges include all values from a lower limit to an upper limit in increments of 1 unit provided that there is a separation of at least 2 units between any lower value and any higher value. For example, if a compositional, physical, or other property (such as molecular weight and melt index) is stated as 100 to 1,000, it is meant to expressly recite all individual values, such as 100, 101, and 102, and all subranges, such as 100 to 166, 155 to 170, and 198 to 200. For ranges containing numerical values less than 1 or containing fractional numbers greater than 1 (such as 1.1 and 1.5), 1 unit is considered to be 0.0001, 0.001, 0.01, or 0.1, as appropriate. For ranges containing single digit numbers less than 10 (such as 1 to 5), 1 unit is typically considered to be 0.1. These are only specific examples of what is intended to be expressed, and all possible combinations of numerical values between the minimum and the maximum enumerated are considered to be expressly recited in this application.

When used with reference to a chemical compound, unless expressly stated otherwise, the singular includes all isomeric forms and vice versa (for example, "hexane" includes all isomers of hexane, individually or collectively). In addition, terms described with "a", "an", or "the" also include plural forms thereof unless expressly stated otherwise.

The terms "containing", "including", "having" and their derivatives do not exclude the existence of any other components, steps, or processes, and have nothing to do with whether these other components, steps, or processes are disclosed in the present application. To remove any doubt, all compositions in this application using the terms "containing", "including," or "having" may include any additional additives, auxiliary materials, or compounds, unless expressly stated otherwise. Conversely, the term "consisting essentially of" excludes any other components, steps, or processes from the hereinafter recited scope of any that term. The term "consisting of" does not include any component, step, or process not specifically described or listed. Unless expressly stated otherwise, the term "or" refers to the listed members individually or to any combination thereof.

To make the technical problems solved by the present disclosure, technical solutions, and beneficial effects clearer, the present disclosure will be further described in detail with reference to examples.

EXAMPLES

The following examples are used herein to demonstrate preferred embodiments of the present disclosure. It should be appreciated by those of skill in the art that the techniques disclosed in the following examples represent techniques discovered by the inventors to be employed in the practice of the present disclosure, and thus can be considered preferred modes for its practice. However, those skilled in the art should understand from this specification that many modifications can be made to the specific examples disclosed herein, and the same or similar results can still be obtained without departing from the spirit or scope of the present disclosure.

Unless otherwise specified, technical and scientific terms used all have the same meanings as those as generally understood by a person of ordinary skill in the art to which the present disclosure belongs. All public references and the materials cited here will be incorporated by reference.

Those skilled in the art will recognize, or be able to ascertain through routine experimentation, many equivalents to the specific examples of the present disclosure described herein. Such equivalents are to be covered by the claims.

Example 1

This example provides a system for low-temperature treatment of heavy metals and dioxins in fly ash. The system is shown in FIG. 1, including:

a water washing tank configured to receive fly ash and water, and wash the fly ash;

a plate and frame filter press connected to the water washing tank, and configured to conduct solid-liquid separation on an obtained water-washed fly ash, and then transport an obtained fly ash slurry to the water washing tank using a diaphragm pump to repeat three times of water washing;

a primary buffer tank connected to the plate and frame filter press, and configured to store a resulting primary fly ash water washing solution after first pressure filtration;

a secondary buffer tank connected to the plate and frame filter press and the water washing tank, and configured to store a resulting secondary fly ash water washing solution after second pressure filtration, and pump the secondary fly ash water washing solution into the water washing tank for recycling;

a tertiary buffer tank connected to the plate and frame filter press and the water washing tank, and configured to store a resulting tertiary fly ash water washing solution after third pressure filtration, and pump the tertiary fly ash water washing solution into the water washing tank for recycling;

a single-cylinder dryer connected to the plate and frame filter press, and configured to dry an obtained tertiary fly ash slurry after tertiary water washing and pressure filtration;

a stirring reactor connected to the single-cylinder dryer, and configured to conduct a heat treatment at 300° C. to 350° C. and a low-temperature heat treatment at 200°

C. to 250° C. on the fly ash; where flue gas in the stirring reactor provides a heat source for the single-cylinder dryer;

a metering feeder connected to the stirring reactor, and configured to separately deliver the calcium-based additive for the reaction at 300° C. to 350° C. and the low-temperature section-targeted pyrolysis additive for the reaction at 200° C. to 250° C. to the stirring reactor;

a nitrogen generator connected to the stirring reactor, and configured to supply nitrogen to the stirring reactor;

a natural gas burner connected to the stirring reactor, and configured to provide a heat source for a heating layer of the stirring reactor by burning natural gas.

Example 2

This example provides use of the system for low-temperature treatment in Example 1 in a low-temperature treatment of heavy metals and dioxins in fly ash.

A method for low-temperature treatment of heavy metals and dioxins in fly ash specifically included the following steps:

S1, the fly ash was transported to the water washing tank, mixed with water at a liquid-to-solid ratio of 3 mL: 1 g, stirred for 20 min, and subjected to primary water washing.

S2, obtained fly ash after the primary water washing was separated by pressure filtration using a plate and frame filter press to obtain a fly ash slurry I and a primary water washing solution. The primary water washing solution was sent to the primary buffer tank for further purification. The fly ash slurry was transported to the water washing tank through the diaphragm pump, replenished with water and mixed with the water again at a liquid-to-solid ratio of 3 mL: 1 g, stirred for 20 min, and subjected to secondary water washing; and separation was conducted by pressure filtration using the plate and frame filter press to obtain a fly ash slurry II and a secondary water washing solution. The fly ash slurry II was transported to the water washing tank through the diaphragm pump. The secondary water washing solution was transported to the secondary buffer tank, pumped to the water washing tank, replenished with a certain amount of pure water to reach a liquid-to-solid ratio of 3 mL: 1 g, stirred for 20 min, and subjected to tertiary water washing; and separation was conducted by pressure filtration using the plate and frame filter press to obtain a fly ash slurry III and a tertiary water washing solution. The tertiary water washing solution was transported to the tertiary buffer tank, and pumped to the water washing tank for cleaning of a next batch of the fly ash slurry.

S3, the fly ash slurry III after the tertiary water washing was sent to the single-cylinder dryer through a screw conveyor to conduct low-temperature drying at 160° C. to 180° C.

S4, obtained dried fly ash was sent to the stirring reactor through a conveyor, and a stirring device was started to crush the dried fly ash.

S5, nitrogen generated by the nitrogen generator was introduced into the stirring reactor for evacuating the air in the stirring reactor; when an oxygen content in the stirring reactor was less than 1%, the natural gas burner was ignited to provide a heat source for the low-temperature pyrolysis of the stirring reactor.

S6, when the stirring reactor reached 300° C. to 350° C., a calcium-based additive was added at 5% to 10% of a mass of the fly ash to the stirring reactor by the metering feeder, and mixed with the fly ash evenly by stirring, to conduct a reaction for 20 min to fully degrade dioxins in the fly ash; where the calcium-based additive was formed by mixing CaO and $CaSO_4$ at a mass ratio of 1:(1-3).

S7, the natural gas burner stopped working, and the stirring reactor was naturally cooled to 250° C.; a low-temperature section-targeted pyrolysis additive was added at 7% of a mass of the fly ash to the stirring reactor by the metering feeder, and then stirred to conduct a reaction for 45 min the low-temperature section-targeted pyrolysis additive was obtained by mixing a phosphate and a ferric salt at a mass ratio of (3-5):1.

This example further provided use of the method for low-temperature treatment of dioxins in fly ash with a toxic equivalent quantity of 357.78 ng-TEQ/kg.

S1, fly ash generated by certain waste incineration with a dioxin toxic equivalent quantity of 357.78 ng-TEQ/kg was transported to the water washing tank, mixed with water at a liquid-to-solid ratio of 3 mL: 1 g, stirred for 20 min, and subjected to primary water washing.

S2, obtained fly ash after the primary water washing was separated by pressure filtration using a plate and frame filter press to obtain a fly ash slurry I and a primary water washing solution. The primary water washing solution was sent to the primary buffer tank for further purification. The fly ash slurry was transported to the water washing tank through the diaphragm pump, replenished with water and mixed with the water again at a liquid-to-solid ratio of 3 mL: 1 g, stirred for 20 min, and subjected to secondary water washing; and separation was conducted by pressure filtration using the plate and frame filter press to obtain a fly ash slurry II and a secondary water washing solution. The fly ash slurry II was transported to the water washing tank through the diaphragm pump. The secondary water washing solution was transported to the secondary buffer tank, pumped to the water washing tank, replenished with a certain amount of pure water to reach a liquid-to-solid ratio of 3 mL: 1 g, stirred for 20 min, and subjected to tertiary water washing; and separation was conducted by pressure filtration using the plate and frame filter press to obtain a fly ash slurry III and a tertiary water washing solution. The tertiary water washing solution was transported to the tertiary buffer tank, and pumped to the water washing tank for cleaning of a next batch of the fly ash slurry.

S3, the fly ash slurry III after the tertiary water washing was sent to the single-cylinder dryer by a screw conveyor, and then subjected to low-temperature drying at 170° C.; and obtained dried fly ash was tested by X-ray fluorescence (XRF) detection. The results showed that the fly ash after tertiary water washing had a soluble chlorine content of 0.93%. However, due to the poor solubility of dioxins in water, there was a mass loss in the fly ash during the water washing; after the water washing and drying, the fly ash had a dioxin toxic equivalent quantity of 570.03 ng-TEQ/kg.

S4, obtained dried fly ash was sent to the stirring reactor through a conveyor, and a stirring device was started to crush the dried fly ash.

S5, nitrogen generated by the nitrogen generator was introduced into the stirring reactor for evacuating the air in the stirring reactor; when an oxygen content in the stirring reactor was less than 1%, the natural gas burner was ignited to provide a heat source for the low-temperature pyrolysis of the stirring reactor.

S6, when the stirring reactor reached 350° C., a calcium-based additive was added at 10% of a mass of the fly ash to the stirring reactor by the metering feeder, and mixed with the fly ash evenly by stirring, to conduct a reaction to fully degrade dioxins in the fly ash; where the calcium-based additive was formed by mixing CaO and CaSO$_4$ at a mass ratio of 1:1.

After 10 min, 20 min, and 30 min, the toxic equivalent quantities of dioxins remaining in a fly ash solid were 12.88 ng-TEQ/kg, 8.44 ng-TEQ/kg, and 6.01 ng-TEQ/kg, respectively. It was seen that the calcium-based additive could improve a pyrolysis efficiency of the dioxins in fly ash.

Example 3

This example provided use of the method for low-temperature treatment described in Example 2 of dioxins in fly ash with a toxic equivalent quantity of 897.04 ng-TEQ/kg.

S1, 1 t of fly ash generated by waste incineration with a dioxin toxic equivalent quantity of 897.04 ng-TEQ/kg was transported to the water washing tank, mixed with water at a liquid-to-solid ratio of 3 mL: 1 g, stirred for 20 min, and subjected to primary water washing.

S2, obtained fly ash after the primary water washing was separated by pressure filtration using a plate and frame filter press to obtain a fly ash slurry I and a primary

10

C.; obtained fly ash after water washing and drying had a soluble chlorine content of less than 2%.

S4, obtained dried fly ash was sent to the stirring reactor through a conveyor, and a stirring device was started to crush the dried fly ash.

S5, nitrogen generated by the nitrogen generator was introduced into the stirring reactor for evacuating the air in the stirring reactor; when an oxygen content in the stirring reactor was less than 1%, the natural gas burner was ignited to provide a heat source for the low-temperature pyrolysis of the stirring reactor.

S6, when the stirring reactor reached 350° C., a calcium-based additive was added at 10% of a mass of the fly ash to the stirring reactor by the metering feeder, and mixed with the fly ash evenly by stirring, to conduct pyrolysis for 30 min, and the stirring reactor was allowed to cool naturally; where the calcium-based additive was formed by mixing CaO and CaSO$_4$ at a mass ratio of 1:1.

S7, when the stirring reactor was cooled to 250° C., a low-temperature section-targeted pyrolysis additive was added at 10% of a mass of the fly ash to the stirring reactor with the metering feeder, and low-temperature pyrolysis was conducted; where the low-temperature section-targeted pyrolysis additive was obtained by mixing Ca$_3$(PO$_4$)$_2$ and Fe$_2$(SO$_4$)$_3$ at a mass ratio of 3:1. After pyrolysis, the heavy metals and dioxins in the fly ash were detected, and the results were shown in Table 1.

TABLE 1

| | | | | detection results | | | | | |
| Item | Hg mg/L | Cd mg/L | Cr mg/L | As mg/L | Pb mg/L | Ni mg/L | Cu mg/L | Zn mg/L | Dioxins ng-TEQ/kg |
|---|---|---|---|---|---|---|---|---|---|
| Original | 2.208 | 1.338 | 6.034 | 1.922 | 8.174 | 1.517 | 0.745 | 7.151 | 897.04 |
| After treatment | 0.017 | 0.005 | 0.644 | 0.011 | 0.001 | 0.074 | 0.003 | 0.538 | 9.401 |
| Standard | 0.05 | 0.1 | 1.5 | 0.5 | 1.0 | 1.0 | 0.5 | 2.0 | 50 | water washing solution. The primary water washing solution was sent to the primary buffer tank for further purification. The fly ash slurry was transported to the water washing tank through the diaphragm pump, replenished with water and mixed with the water again at a liquid-to-solid ratio of 3 mL: 1 g, stirred for 20 min, and subjected to secondary water washing; and separation was conducted by pressure filtration using the plate and frame filter press to obtain a fly ash slurry II and a secondary water washing solution. The fly ash slurry II was transported to the water washing tank through the diaphragm pump. The secondary water washing solution was transported to the secondary buffer tank, pumped to the water washing tank, replenished with a certain amount of pure water to reach a liquid-to-solid ratio of 3 mL: 1 g, stirred for 20 min, and subjected to tertiary water washing; and separation was conducted by pressure filtration using the plate and frame filter press to obtain a fly ash slurry III and a tertiary water washing solution. The tertiary water washing solution was transported to the tertiary buffer tank, and pumped to the water washing tank for cleaning of a next batch of the fly ash slurry.

S3, the fly ash slurry III after the tertiary water washing was sent to the single-cylinder dryer through a screw conveyor to conduct low-temperature drying at 170°

The heavy metal leaching concentration standard was the maximum allowable discharge concentration limit specified in GB 8978.

From the above data, it was seen that the degradation efficiency of dioxin was greater than 98%, and the leaching concentration of heavy metals was less than the national standard.

Example 4

This example provided use of the method for low-temperature treatment described in Example 2 of dioxins in fly ash with a toxic equivalent quantity of 664.33 ng-TEQ/kg.

S1, fly ash generated by certain waste incineration with a dioxin toxic equivalent quantity of 664.33 ng-TEQ/kg was transported to the water washing tank, mixed with water at a liquid-to-solid ratio of 3 mL: 1 g, stirred for 20 min, and subjected to primary water washing.

S2, obtained fly ash after the primary water washing was separated by pressure filtration using a plate and frame filter press to obtain a fly ash slurry I and a primary water washing solution. The primary water washing solution was sent to the primary buffer tank for further purification. The fly ash slurry was transported to the water washing tank through the diaphragm pump, replenished with water and mixed with the water again at a liquid-to-solid ratio of 3 mL: 1 g, stirred for 20 min, and subjected to secondary water washing; and separation was conducted by pressure filtration using the plate and frame filter press to obtain a fly ash slurry II and a secondary water washing solution. The fly ash slurry II was transported to the water washing tank through the diaphragm pump. The secondary water washing solution was transported to the secondary buffer tank, pumped to the water washing tank, replenished with a certain amount of pure water to reach a liquid-to-solid ratio of 3 mL: 1 g, stirred for 20 min, and subjected to tertiary water washing; and separation was conducted by pressure filtration using the plate and frame filter press to obtain a fly ash slurry III and a tertiary water washing solution. The tertiary water washing solution was transported to the tertiary buffer tank, and pumped to the water washing tank for cleaning of a next batch of the fly ash slurry.

S3, the fly ash slurry III after the tertiary water washing was sent to the single-cylinder dryer by a screw conveyor, and then subjected to low-temperature drying at 170° C. However, due to the poor solubility of dioxins in water, there was a mass loss in the fly ash during the water washing; after the water washing and drying, the fly ash had a soluble chlorine content of 1.06% and a dioxin toxic equivalent quantity of 1013.15 ng-TEQ/kg.

S4, obtained dried fly ash was sent to the stirring reactor through a conveyor, and a stirring device was started to crush the dried fly ash.

S5, nitrogen generated by the nitrogen generator was introduced into the stirring reactor for evacuating the air in the stirring reactor; when an oxygen content in the stirring reactor was less than 1%, the natural gas burner was ignited to provide a heat source for the low-temperature pyrolysis of the stirring reactor.

S6, when the stirring reactor reached 350° C., a calcium-based additive was added at 5% of a mass of the fly ash to the stirring reactor by the metering feeder, and mixed with the fly ash evenly by stirring, to conduct pyrolysis for 15 min, and the stirring reactor was allowed to cool naturally; where the calcium-based additive was formed by mixing CaO and $CaSO_4$ at a mass ratio of 1:1.

S7, when the stirring reactor was cooled to 200° C., a low-temperature section-targeted pyrolysis additive was added at 5% of a mass of the fly ash to the stirring reactor with the metering feeder, and low-temperature pyrolysis was conducted for 30 min; where the low-temperature section-targeted pyrolysis additive was obtained by mixing $Ca_3(PO_4)_2$ and $Fe_2(SO_4)_3$ at a mass ratio of 3:1.

Example 5

This example provided use of the method for low-temperature treatment described in Example 2 of dioxins in treatment of fly ash with a toxic equivalent quantity of 664.33 ng-TEQ/kg.

S1, fly ash generated by certain waste incineration with a dioxin toxic equivalent quantity of 664.33 ng-TEQ/kg was transported to the water washing tank, mixed with water at a liquid-to-solid ratio of 3 mL: 1 g, stirred for 20 min, and subjected to primary water washing.

S2, obtained fly ash after the primary water washing was separated by pressure filtration using a plate and frame filter press to obtain a fly ash slurry I and a primary water washing solution. The primary water washing solution was sent to the primary buffer tank for further purification. The fly ash slurry was transported to the water washing tank through the diaphragm pump, replenished with water and mixed with the water again at a liquid-to-solid ratio of 3 mL: 1 g, stirred for 20 min, and subjected to secondary water washing; and separation was conducted by pressure filtration using the plate and frame filter press to obtain a fly ash slurry II and a secondary water washing solution. The fly ash slurry II was transported to the water washing tank through the diaphragm pump. The secondary water washing solution was transported to the secondary buffer tank, pumped to the water washing tank, replenished with a certain amount of pure water to reach a liquid-to-solid ratio of 3 mL: 1 g, stirred for 20 min, and subjected to tertiary water washing; and separation was conducted by pressure filtration using the plate and frame filter press to obtain a fly ash slurry III and a tertiary water washing solution. The tertiary water washing solution was transported to the tertiary buffer tank, and pumped to the water washing tank for cleaning of a next batch of the fly ash slurry.

S3, the fly ash slurry III after the tertiary water washing was sent to the single-cylinder dryer by a screw conveyor, and then subjected to low-temperature drying at 170° C. However, due to the poor solubility of dioxins in water, there was a mass loss in the fly ash during the water washing; after the water washing and drying, the fly ash had a soluble chlorine content of 1.06% and a dioxin toxic equivalent quantity of 1013.15 ng-TEQ/kg.

S4, obtained dried fly ash was sent to the stirring reactor through a conveyor, and a stirring device was started to crush the dried fly ash.

S5, nitrogen generated by the nitrogen generator was introduced into the stirring reactor for evacuating the air in the stirring reactor; when an oxygen content in the stirring reactor was less than 1%, the natural gas burner was ignited to provide a heat source for the low-temperature pyrolysis of the stirring reactor.

S6, when the stirring reactor reached 350° C., a calcium-based additive was added at 5% of a mass of the fly ash to the stirring reactor by the metering feeder, and mixed with the fly ash evenly by stirring, to conduct pyrolysis for 15 min, and the stirring reactor was allowed to cool naturally; where the calcium-based additive was formed by mixing CaO and $CaSO_4$ at a mass ratio of 1:1.

S7, when the stirring reactor was cooled to 200° C., a low-temperature section-targeted pyrolysis additive was added at 5% of a mass of the fly ash to the stirring reactor with the metering feeder, and low-temperature pyrolysis was conducted for 15 min; where the low-temperature section-targeted pyrolysis additive was obtained by mixing $Ca_3(PO_4)_2$ and $Fe_2(SO_4)_3$ at a mass ratio of 3:1.

Comparative Example 1

Comparative Example 1 was differed from Example 4 in that: in Comparative Example 1, only an additive obtained by mixing CaO and $CaSO_4$ at a mass ratio of 1:1 was added at 10% of a mass of the fly ash in step S6, and no low-temperature section-targeted pyrolysis additive was added in step S7.

13

Comparative Example 2

Comparative Example 2 was differed from Example 4 in that: in Comparative Example 2, only an additive obtained by mixing $Ca_3(PO_4)_2$ and $Fe_2(SO_4)_3$ at a mass ratio of 3:1 was added at 10% of a mass of the fly ash in step S7, and no calcium-based additive was added in step S6.

Comparative Example 3

Comparative Example 3 was differed from Example 4 in that: in Comparative Example 3, only sodium sulfide was added at 10% of a mass of the fly ash in step S6, and no low-temperature section-targeted pyrolysis additive was added in step S7.

Comparative Example 4

Comparative Example 4 was differed from Example 4 in that: in Comparative Example 4, only a silica gel was added at 10% of a mass of the fly ash in step S6, and no low-temperature section-targeted pyrolysis additive was added in step S7.

The heavy metals and dioxins in fly ash samples after pyrolysis of Examples 4 to 5 and Comparative Examples 1 to 4 were detected, and the results were shown in Table 2.

TABLE 2 detection results

| Item | Fly ash after water washing | Example 4 | Example 5 | Comparative Example 1 | Comparative Example 2 | Comparative Example 3 | Comparative Example 4 | Standard |
|---|---|---|---|---|---|---|---|---|
| Hg (mg/L) | 3.721 | 0.0069 | 0.011 | 0.021 | 3.509 | 1.094 | 1.910 | 0.05 |
| Cd (mg/L) | 3.670 | 0.0052 | 0.004 | 0.274 | 0.139 | 0.750 | 0.274 | 0.1 |
| Cr (mg/L) | 6.343 | 0.0003 | 0.001 | 0.001 | 2.005 | 1.005 | 0.540 | 1.5 |
| As (mg/L) | 0.785 | 0.0059 | 0.007 | 0.035 | 0.590 | 0.390 | 0.675 | 0.5 |
| Pb (mg/L) | 2.155 | 0.2657 | 0.221 | 0.573 | 3.572 | 0.572 | 0.332 | 1.0 |
| Ni (mg/L) | 2.001 | 0.0012 | 0.009 | 0.112 | 1.969 | 0.991 | 1.287 | 1.0 |
| Cu (mg/L) | 2.008 | 0.0013 | 0.010 | 0.253 | 1.746 | 0.980 | 1.321 | 0.5 |
| Zn (mg/L) | 4.055 | 0.2724 | 0.180 | 1.139 | 4.008 | 3.168 | 2.011 | 2.0 |
| Dioxin toxic equivalent quantity (ng-TEQ/kg) | 1013.15 | 5.302 | 7.191 | 26.014 | 6.570 | 15.170 | 12.007 | 50 |

Note: the heavy metal leaching concentration standard was the maximum allowable discharge concentration limit specified in GB 8978.

It was seen from the data in the table that the calcium-based additive could form complexes with heavy metals Cd and Cr, so as to effectively reduce the leaching concentration of heavy metals and facilitate the thermal degradation of dioxins, but could increase the leaching concentration of Pb. The mixture of $Ca_3(PO_4)_2$ and $Fe_2(SO_4)_3$ could stabilize most heavy metals, but had a lower stabilizing effect on Cd. When the two additives were used together, the leaching concentration of each heavy metal was significantly reduced, meeting the national standard. However, the common heavy metal stabilizers Na 2S and silica gel had a strong adsorption effect on heavy metals such as Pb, Cd, and Cr, so as to effectively reduce the leaching concentration of heavy metals, but had a poor adsorption effect on other heavy metals, which was not up to the standard.

All documents mentioned in the present disclosure are cited as references in the present application, as if each document was individually cited as a reference. In addition, it should be understood that various changes or modifications may be made to the present disclosure by those skilled in the art after reading the above teaching content of the present disclosure, and these equivalent forms also fall within the scope defined by the appended claims of the present disclosure.

What is claimed is:

1. A system for low-temperature treatment of heavy metals and dioxins in fly ash, comprising:
   a water washing tank configured to receive fly ash and water, and wash the fly ash;
   a plate and frame filter press connected to the water washing tank, and configured to conduct solid-liquid separation on an obtained water-washed fly ash, and then transport an obtained fly ash slurry to the water washing tank using a diaphragm pump to repeat three times of water washing;
   a buffer tank connected to the plate and frame filter press and the water washing tank, and configured to store an obtained fly ash water washing solution after pressure filtration, and pump the fly ash water washing solution to the water washing tank for secondary use;
   a single-cylinder dryer connected to the plate and frame filter press, and configured to dry an obtained tertiary fly ash slurry after tertiary water washing and pressure filtration;
   a stirring reactor connected to the single-cylinder dryer, and configured to conduct a heat treatment at 300° C. to 350° C. and a low-temperature heat treatment at 200° C. to 250° C. on the fly ash;
   a metering feeder connected to the stirring reactor, and configured to separately deliver a calcium-based additive for a reaction at 300° C. to 350° C. and a low-temperature section-targeted pyrolysis additive for a reaction at 200° C. to 250° C. to the stirring reactor; and
   a nitrogen generator connected to the stirring reactor, and configured to supply nitrogen to the stirring reactor.

2. The system for low-temperature treatment of heavy metals and dioxins in fly ash according to claim 1, further comprising a natural gas burner connected to the stirring reactor, wherein the natural gas burner is configured to provide a heat source for a heating layer of the stirring reactor by burning natural gas.

3. The system for low-temperature treatment of heavy metals and dioxins in fly ash according to claim 1, wherein the buffer tank comprises a primary buffer tank, a secondary buffer tank, and a tertiary buffer tank; the primary buffer tank is connected to the plate and frame filter press, and is configured to store a resulting primary fly ash water washing solution after first pressure filtration; the secondary buffer tank is connected to the plate and frame filter press and the water washing tank, and is configured to store a resulting secondary fly ash water washing solution after second pressure filtration; and the tertiary buffer tank is connected to the plate and frame filter press and the water washing tank, and is configured to store a resulting tertiary fly ash water washing solution after third pressure filtration.

4. A method for low-temperature treatment of heavy metals and dioxins in fly ash using the system for low-temperature treatment according to claim 1, comprising the following steps:

S1, receiving fly ash and water with the water washing tank, and conducting water washing;

S2, conducting pressure filtration on a water-washed fly ash obtained in step S1 with the plate and frame filter press to obtain a fly ash slurry and a primary water washing solution; transporting the fly ash slurry to the water washing tank with the diaphragm pump to conduct secondary water washing, and repeating the water washing twice to obtain fly ash after tertiary water washing;

S3, drying the fly ash after tertiary water washing with the single-cylinder dryer;

S4, crushing dried fly ash obtained in step S3 with the stirring reactor;

S5, evacuating air in the stirring reactor with nitrogen generated by the nitrogen generator; and when an oxygen content in the stirring reactor is less than 1%, providing a heat source for the stirring reactor with a natural gas burner;

S6, when the stirring reactor reaches 300° C. to 350° C., adding the calcium-based additive to the stirring reactor with the metering feeder; and S7, when the stirring reactor is cooled to 200° C. to 250° C., adding the low-temperature section-targeted pyrolysis additive to the stirring reactor after step S6 with the metering feeder, and conducting low-temperature pyrolysis; wherein the low-temperature section-targeted pyrolysis additive is added at 5% to 10% of a mass of the fly ash.

5. The method for low-temperature treatment of heavy metals and dioxins in fly ash according to claim 4, wherein in step S1, the fly ash and the water are mixed at a liquid-to-solid ratio of 3 mL: 1 g.

6. The method for low-temperature treatment of heavy metals and dioxins in fly ash according to claim 4, wherein in step S3, the single-cylinder dryer has an operating temperature of 100° C. to 180° C.

7. The method for low-temperature treatment of heavy metals and dioxins in fly ash according to claim 4, wherein in step S6, the calcium-based additive is added at 5% to 10% of a mass of the fly ash.

8. The system for low-temperature treatment of heavy metals and dioxins in fly ash according to claim 1, wherein the low-temperature section-targeted pyrolysis additive is obtained by mixing a phosphate and a ferric salt at a mass ratio of (3-5):1.

9. The system for low-temperature treatment of heavy metals and dioxins in fly ash according to claim 8, wherein the calcium-based additive is obtained by mixing CaO and $CaSO_4$ at a mass ratio of 1:(1-3); the phosphate is selected from the group consisting of $Ca_3(PO_4)_2$, $Ca(H_2PO_4)_2$, and $NaH_2PO_4$; and the ferric salt is selected from the group consisting of $Fe_2(SO_4)_3$ and $Fe(NO_3)_3$.

* * * * *